United States Patent
Lee et al.

(10) Patent No.: US 10,037,134 B2
(45) Date of Patent: Jul. 31, 2018

(54) ELECTRONIC DEVICE AND TASK CONFIGURING METHOD OF ELECTRONIC DEVICE

(71) Applicant: Samsung Electronics Co., Ltd., Gyeonggi-do (KR)

(72) Inventors: Hyemi Lee, Incheon (KR); Hyunkyoung Kim, Seoul (KR); Daesung Kim, Gyeonggi-do (KR); Yumi Ahn, Seoul (KR); Jihyun Ahn, Seoul (KR)

(73) Assignee: Samsung Electronics Co., Ltd (KR)

( * ) Notice: Subject to any disclaimer, the term of this patent is extended or adjusted under 35 U.S.C. 154(b) by 612 days.

(21) Appl. No.: 14/573,695

(22) Filed: Dec. 17, 2014

(65) Prior Publication Data
US 2015/0169163 A1    Jun. 18, 2015

(30) Foreign Application Priority Data
Dec. 17, 2013   (KR) .................. 10-2013-0157002

(51) Int. Cl.
  *G06F 3/048* (2013.01)
  *G06F 3/0486* (2013.01)
  *G06F 3/041* (2006.01)
  *G06F 3/0484* (2013.01)
  *G06F 3/0488* (2013.01)
  (Continued)

(52) U.S. Cl.
  CPC .......... *G06F 3/0486* (2013.01); *G06F 3/0416* (2013.01); *G06F 3/0488* (2013.01);
  (Continued)

(58) Field of Classification Search
  CPC .. G06F 21/32; G06F 21/83; G06F 2203/0338; G06F 3/0416; G06F 3/04842;
  (Continued)

(56) References Cited

U.S. PATENT DOCUMENTS

| 5,745,112 A | * | 4/1998 | Hirose | G06F 3/0486 |
| | | | | 715/769 |
| 7,697,729 B2 | * | 4/2010 | Howell | G06F 3/011 |
| | | | | 345/156 |

(Continued)

FOREIGN PATENT DOCUMENTS

| JP | 2004-334788 | 11/2004 |
| KR | 10-2005-0038542 | 4/2005 |

(Continued)

OTHER PUBLICATIONS

European Search Report dated Aug. 18, 2017 issued in counterpart application No. 14873059.1-1870, 6 pages.

(Continued)

*Primary Examiner* — Thanh Vu
(74) *Attorney, Agent, or Firm* — The Farrell Law Firm, P.C.

(57) ABSTRACT

A task configuring method of an electronic device using fingerprint recognition is provided. The method including displaying a first area including at least one item which a user can select and a second area which displays the selected at least one item, sensing a touch event used to move the at least one item from the first area to the second area, identifying a fingerprint of a finger which generates the touch event, and configuring a task by combining the at least one moved item and the identified fingerprint.

18 Claims, 7 Drawing Sheets

(51) Int. Cl.
    *G06F 21/32*      (2013.01)
    *G06K 9/00*       (2006.01)
    *G06F 9/451*      (2018.01)
(52) U.S. Cl.
    CPC .......... *G06F 3/04842* (2013.01); *G06F 9/451* (2018.02); *G06F 21/32* (2013.01); *G06K 9/00013* (2013.01); *G06F 2203/0338* (2013.01)
(58) Field of Classification Search
    CPC .... G06F 3/0486; G06F 3/0488; G06F 9/4443; G06K 9/00013
    See application file for complete search history.

(56) References Cited

U.S. PATENT DOCUMENTS

| | | | |
|---|---|---|---|
| 8,023,700 | B2 | 9/2011 | Rilonheimo |
| 8,390,584 | B1 | 3/2013 | Bhojan |
| 2005/0085217 | A1 | 4/2005 | Lim |
| 2008/0042983 | A1 | 2/2008 | Kim et al. |
| 2009/0247112 | A1 | 10/2009 | Lundy et al. |
| 2010/0225607 | A1 | 9/2010 | Kim |
| 2010/0265204 | A1* | 10/2010 | Tsuda .................... G06F 1/1626 345/174 |
| 2013/0133033 | A1 | 5/2013 | Davis et al. |
| 2015/0004939 | A1* | 1/2015 | Higashibeppu ......... H04M 1/67 455/411 |

FOREIGN PATENT DOCUMENTS

| | | |
|---|---|---|
| KR | 1020080000481 | 1/2008 |
| WO | WO 2009/120925 | 10/2009 |

OTHER PUBLICATIONS

International Search Report dated Mar. 12, 2015 issued in counterpart application No. PCT/KR2014/012446.

\* cited by examiner

ELECTRONIC DEVICE AND TASK CONFIGURING METHOD OF ELECTRONIC DEVICE

PRIORITY

This application claims priority under 35 U.S.C. § 119(a) to Korean Patent Application Serial No. 10-2013-0157002, which was filed in the Korean Intellectual Property Office on Dec. 17, 2013, the entire disclosure of which is incorporated herein by reference.

BACKGROUND OF THE INVENTION

1. Field of the Invention

The present invention relates generally to a task configuring method for an electronic device, and more particularly, to a task configuring method for an electronic device using fingerprint recognition.

2. Description of the Related Art

In recent years, electronic devices having fingerprint recognition devices have been widely used for processing a fingerprint, which is at a low risk of being pirated or imitated and is almost never changed.

In general, repeatedly and frequently used tasks which may be associated with electronic devices are configured as shortcuts. However, such shortcuts are, typically, generated using one or more complicated processes.

SUMMARY OF THE INVENTION

The present invention has been made to address at least the problems and/or disadvantages described above and to provide at least the advantages described below.

In accordance with an aspect of the present invention, a task configuring method of an electronic device using fingerprint recognition is provided. The method includes displaying a first area including at least one item which a user can select and a second area which displays the selected at least one item, sensing a touch event used to move the at least one item from the first area to the second area, identifying a fingerprint of a finger which generates the touch event, and configuring a task by combining the at least one moved item and the identified fingerprint.

In accordance with another aspect of the present invention, an electronic device is provided. The electronic device includes a display unit, a user input unit a fingerprint recognition unit, and a controller configured to display, on the display unit, a first area including at least one item which a user can select and a second area which displays the selected at least one item, sense, through the user input unit, a touch event used to move the at least one item from the first area to the second area, identify, through the fingerprint recognition unit, a fingerprint of a finger which generates the touch event, and configure a task by combining the at least one moved item and the identified fingerprint.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF EMBODIMENTS OF THE PRESENT INVENTION

Various embodiments of the present invention are described in detail below with reference to the accompanying drawings. The same reference numbers are used throughout the drawings to refer to the same or like parts. Additionally, detailed descriptions of well-known functions and structures incorporated herein may be omitted to avoid obscuring the subject matter of the present invention. As used herein, the term "and/or" includes any and all combinations of one or more of the associated listed items.

Figure 1:
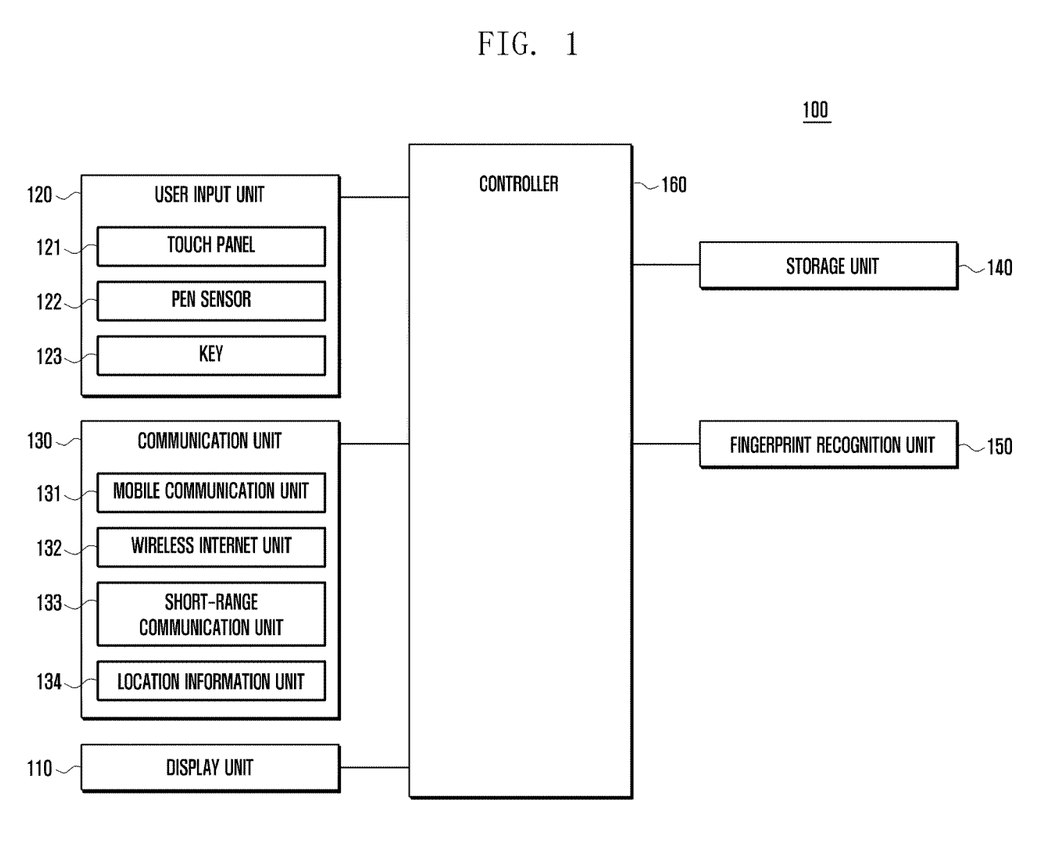
FIG. 1 is a block diagram illustrating an electronic device, according to an embodiment of the present invention.

FIG. 1 is a block diagram illustrating a configuration of an electronic device 100, according to an embodiment of the present invention. The electronic device 100 can be embodied in a smartphone or one or more other devices. For example, the electronic device 100 may be embodied in a tablet Personal Computer (PC), a Portable Multimedia Player (PMP), a Personal Digital Assistant (PDA), a laptop PC, a wearable device such as a wrist watch and a Head-Mounted Display (HMD), etc.

The electronic device 100 includes a display unit 110, a user input unit 120, a communication unit 130, a storage unit 140, an audio unit 150, and a controller 160.

The display unit 110 displays an image or data to a user. The display unit 110 may include a display panel. For example, a Liquid Crystal Display (LCD), an Active Matrix Organic Light Emitting Diode (AMOLED), or the like may be employed as the display panel. The display unit 110 may further include a controller for controlling the display panel. The display panel may be, for example, flexible, transparent, and/or wearable.

The display unit 110 may include a touch screen, which may be combined with a touch panel 121. For example, the touch screen may include an integral module, in which the display panel and the touch panel 121 are combined in a laminated structure.

The display unit 110 may display a condition area and a task configuring area under a control of the controller 160.

The user input unit 120 receives various commands from a user and includes at least one of the touch panel 121, a pen sensor 122 and/or a key 123.

The touch panel 121 recognizes a touch input by the user on the basis of at least one of, for example, a capacitive type, a resistive type, an infrared type, and an acoustic wave type. The touch panel 121 may further include a controller.

In the case where the touch panel is the capacitive type panel, which recognizes touch input by a user, proximity awareness in addition to direct touch is possible. The touch panel 121 may further include a tactile layer. In this case, the touch panel 121 may provide a user with a tactile reaction.

The pen sensor 122 may be implemented using a separate pen recognition sheet, for example, in a scheme equivalent to the scheme in which a touch input of a user is received.

Examples of the key 123 may include a mechanical key, a touch key, or the like. The mechanical key may include at least one of a power button provided at one side of the electronic device 100 to switch on a display of the electronic device 100 when the power button is pushed, one or more volume buttons located at the other side of the electronic device 100 to control a volume when the one or more volume buttons are pushed, and a home button, which may be provided at a lower central side of the display unit 110 of the electronic device 100 to move the display to a home screen when the home button is pushed. The touch key may include at least one of a menu key, which may be provided on a first surface of the lower end of the display unit 110 of the electronic device 100, to provide a menu related to a currently-displayed content when the menu key is touched, and a return key, which may be provided on second surface of the lower end of the display unit 110 of the electronic device 100, to return to a screen prior to a currently-displayed screen when the return key is touched.

The communication unit 130 includes at least one of a mobile communication unit 131, a wireless communication unit 132, a short-range communication unit 133 and a location information unit 134.

The mobile communication unit 131 transmits/receives a wireless signal to/from at least one of a base station, an external terminal, and a server on a mobile communication network. The wireless signal may include, for example, a voice call signal, a video call signal, or various types of data according to transmission/reception of text/multimedia messages.

The wireless communication unit 132 is provided to access a wireless network. Wireless Local Area Network (WLAN) (Wi-Fi), Wireless broadband (Wibro), World Interoperability for Microwave Access (Wimax), High Speed Downlink Packet Access (HSDPA), etc. may be used by the electronic device 100.

The short-range communication unit 133 is provided for short-range communication. Bluetooth™, Radio Frequency IDentification (RFID), Infrared Data Association (IrDA), Ultra WideBand (UWB), ZigBee™, etc. may be used by the electronic device 100.

The location information unit 134 is provided for obtaining or identifying a location of a mobile terminal. The location information unit 134 may obtain location information, using a Global Navigation Satellite System (GNSS). The GNSS, as used herein, describes wireless navigation satellite systems in which predetermined types of wireless navigation receivers rotate around the earth and transmit reference signals for determining the earth's surface or locations of the wireless navigation receivers near the earth's surface. Examples of the GNSS are the Global Positioning System (GPS) operated by USA, the Galileo system operated by Europe, the Global Orbiting Navigational Satellite System (GLONASS) operated by Russia, the Compass system operated by China, the Quasi-Zenith Satellite System (QZSS) operated by Japan, etc.

Additionally, the communication unit 130 may include a network interface (for example, LAN card), a modem, etc. for connecting the electronic device 100 with a network (for example, the Internet, LAN, Wide Area Network (WAN), telecommunication network, cellular network, satellite network or Plain Old Telephone System(POTS)).

The storage unit 140 may include at least one of an internal memory and an external memory.

The internal memory may include at least one of, for example, a volatile memory (e.g. a Dynamic Random Access Memory (DRAM), a Static RAM (SRAM), a Synchronous Dynamic RAM (SDRAM), etc.), a non-volatile memory (e.g. an One Time Programmable Read-Only Memory (OTPROM), a Programmable ROM (PROM), an Erasable and Programmable ROM (EPROM), an Electrically Erasable and Programmable ROM (EEPROM), a Mask ROM, a Flash ROM, etc.), a Hard Disk Drive (HDD), and a Solid State Drive (SSD). The controller 160 processes a command or data received from at least one of the non-volatile memory and other components by loading the command or the data in the volatile memory. Further, the controller 160 stores the data received from or generated by other components in the non-volatile memory.

The external memory may include at least one of a Compact Flash (CF), a Secure Digital (SD), a Micro Secure Digital (Micro-SD), a Mini Secure Digital (Mini-SD), an extreme Digital (xD) and a memory stick.

The storage unit 140 stores an operating system for controlling resources of the electronic device 100 and an application program for an operation of an application. The operating system may include a kernel, middleware, an Application Program Interface (API), etc. For example, Android™, iOS, Windows™, Symbian™, Tizen™, or Bada™ can be employed as the operating system.

The kernel may include a system resource manager and a device driver, which can manage resources. The resource manager may include, for example, a controller management unit, a memory management unit, a file system management unit, or the like and can perform a function of control, allocation, retrieve or the like of the system resource. The device driver can control various components of the electronic device 100 in a software scheme. To this end, the device driver may be divided into an interface and an individual driver module part provided by each hardware company. The device driver may include at least one of, for example, a display driver, a camera driver, a Bluetooth™ driver, a share memory driver, a Universal Serial Bus (USB) driver, a keypad driver, a Wi-Fi driver, an audio driver and an Inter-Process Communication (IPC) driver.

The middleware may include a plurality of modules implemented in advance to provide functions commonly required for various applications. The middleware may provide the commonly required functions through the API such that the application can efficiently use limited system resources within the electronic device. The middleware may include at least one of, for example, an application manager, a window manager, a multimedia manager, a resource manager, a power manager, a database manager, and a package manager. Further, the middleware may include at least one of a connectivity manager, a notification manager, a location manager, a graphic manager and a security manager. Further, the middleware may include a runtime library or other library modules. The runtime library is a library module that a compiler uses in order to add a new function through a programming language while an application is being executed. For example, the runtime library can perform a function of input/output, memory management or an arithmetic function. The middleware may generate a new middleware module through various functional combinations of the aforementioned internal component modules, and use the new middleware module. The middleware may provide a module specialized for each type of OS in order to provide a differentiated function.

The API corresponds to a set of API programming functions and may be provided to have a different configuration according to the OS. When the OS corresponds to Android™ or iOS, for example, one API set may be provided for each platform, and when the OS corresponds to Tizen™, for example, two or more API sets may be provided.

The application may perform one or more functions, using an application program. The application may be classified into, for example, a preloaded application and a third party application. The application may include, for example, a home application for executing a home screen, a dialer application, a Short Message Service (SMS)/Multimedia Message service (MMS) application, an Instant Message (IM) application, a browser application, a camera application, an alarm application, a contacts (or address book) application, a voice dial application, an email application, a calendar application, a media player, an album application, and a clock application.

The fingerprint recognition unit 150 may be an input image device for acquiring a fingerprint image (or image information of a fingerprint) having inherent characteristics according to users. An optical scheme, a semiconductor scheme, an ultrasonic scheme and/or a contactless scheme may be used for sensing data of the fingerprint image.

For example, if the fingerprint recognition unit 150 uses the optical scheme, the fingerprint recognition unit 150 may include an optical fingerprint recognition sensor that may include, for example, a prism, a light source, a lens, a Charge-Coupled Device (CCD) or the like. In the optical scheme, when a fingerprint comes into contact with the prism, the light source irradiates light on the prism, the lens collects light reflected through the prism, and the CDD acquires the collected light as a fingerprint image.

If the fingerprint recognition unit 150 uses the semiconductor scheme, the fingerprint recognition unit 150 may include a semi-conductive fingerprint recognition sensor that may include a heat-sensitive fingerprint recognition sensor, a capacitive fingerprint recognition sensor, an electric field type fingerprint recognition sensor or the like. The semi-conductive fingerprint recognition sensor may be miniaturized and may be used for an application product which a person uses. The heat-sensitive fingerprint recognition sensor may use a scheme of acquiring a fingerprint image using a temperature distribution obtained by a temperature difference between a contact part and a non-contact part of the fingerprint. The capacitive fingerprint recognition sensor may use a scheme of acquiring a fingerprint image using a difference in an amount of charged particles or a capacitance between ridges of a contact part of the fingerprint. The electric field type fingerprint recognition sensor may use a scheme of acquiring fingerprint image information from an electric field formed at a fingerprint which is in contact with the sensor or around the fingerprint.

The fingerprint recognition unit 150 may be a part of the controller 160. For example, the fingerprint recognition unit 150 may perform an operation of correcting the fingerprint image, an operation of calculating characteristics of the fingerprint image, or the like, in addition to the operation of acquiring the fingerprint image. In this case, the fingerprint recognition unit 150 may be a functional module having a hardware module and a software module.

The fingerprint recognition unit 150 may be mounted on a surface of a housing of the electronic device 100. For example, the fingerprint recognition unit 150 may be coupled to the touch panel 121 of the electronic device 100. In accordance with embodiments of the present invention, the fingerprint recognition unit 150 is laminated on the touch panel 121 and the display unit 110, such that one surface of the fingerprint recognition sensor, which may be in contact with a fingerprint, is exposed on the touch panel 121.

The controller 160 controls a plurality of hardware and software components connected to the controller 160 by driving an operating system and an application program and may process and calculate various pieces data including multimedia data. The controller 160 may be implemented by, for example, a System on Chip (SoC) and may further include a Graphic Processing Unit (GPU).

The controller 160 controls the display unit 110 to display a first area including an item which a user can designate and a second area on which an operation to be performed by a combination of items is displayed.

For example, the first area includes a condition which a user is to perform (e.g., a task list and an item which a user can designate). The item which a user can designate may be the condition which a user is to perform. The first area may be a condition area including the condition which a user is to perform. For example, the condition area may include an area on which at least one task execution subject is displayed and an area on which a task execution object is displayed. The area on which the task execution subject is displayed can display, for example, an application list including applications which perform at least one task, a communication channel list (e.g., a phone call, a message, an E-mail and a Social Network Service (SNS)), and a function list of an electronic device (e.g., taking a picture, finding, listening to music, and navigation). The area on which the task execution object is displayed displays a target to perform a task. The area on which the task execution object is displayed may include, for example, a person's name, a location, a file name, etc.

The second area, on which an operation to be performed by a combination of items is displayed, corresponds to an area, on which a user displays the selected condition and a fingerprint of the user is recognized. The second area can display a task to be generated by the selected condition when a user generates a touch event by which a condition (or a task list) is moved from the condition area to a task configuring area. The item which a user can designate may be the condition which a user is to perform. The second area may be a task configuring area on which a task to be generated by a condition which a user is to perform is displayed. For example, the operation of generating the touch event by which the condition (or the task list, or the item which a user can designate) is moved from the condition area to the task configuring area, by a user, may be an operation of dragging or swiping the condition (or the task list or the item which a user can designate) to the task configuring area. For example, the electronic device 100 can sense the operation of dragging and/or swiping the condition (or the task list) to the task configuring area to recognize a fingerprint of a user.

For example, the electronic device 100 can sense a fingerprint of a user while at least one condition (or the task list, or the item which a user can designate) is being moved from the condition area to the task configuring area, can sense a fingerprint of a user while at least one condition (or the task list, or the item which a user can designate) has been completely moved from the condition area to the task configuring area, or can sense a fingerprint of a user when at least one condition (or the task list, or the item which a user can designate) is touched in the condition area. The electronic device 100, when a plurality of fingerprints of fingers generate a touch event, senses a fingerprint of a finger, which generates the final touch event. The touch panel 121 can sense a touch event by which the condition (or the task list, or the item which a user can designate) is selected and is moved from the condition area to the task configuring area and can transmit the sensed signal to the controller 160.

When a user generates a touch event by which the task execution subject and the task execution object are selected in the condition area, the touch panel 121 can sense the touch event. For example, the touch event may be the operation of dragging and/or swiping the condition (or the task list, or the item which a user can designate) to the task configuring area. The touch event sensed by the touch panel 121 may be transmitted to the controller 160.

The fingerprint recognition unit 150 senses a fingerprint of a finger, which generates the touch event, and transmits the sensed fingerprint to the controller 160.

When a user generates a touch event by which the task execution subject and the task execution object are selected in the condition area, the fingerprint recognition unit 150 senses a fingerprint of a finger which generates the touch event. For example, the fingerprint recognition unit 150 senses which finger from among the five fingers of a left hand or a right hand of a user is the finger having a fingerprint which has generated the touch event by which the condition (or the task list, or the item which a user can designate) is dragged and/or swiped to the task configuring area.

The controller 160 determines whether the fingerprint of the finger, which generates the touch event sensed by the fingerprint recognition unit 150, is a fingerprint which has been registered beforehand. The storage unit 140 stores fingerprints which have been registered beforehand. The controller 160 receives, from the storage unit 140, the pre-registered fingerprint stored in the storage unit 140, in order to determine whether the sensed fingerprint is the pre-registered fingerprint.

When the sensed fingerprint is registered beforehand, the controller 160 configures a task by combining the selected condition and the sensed (or identified) fingerprint. For example, the operation of configuring the task by combining the selected (or moved) condition and the sensed fingerprint corresponds to configuring a shortcut and corresponds to configuring a task such that a selected task execution subject can execute a selected task execution object when the sensed fingerprint is input to the electronic device 100.

For example, the fingerprint recognition unit 150 senses one or more fingerprints which generate a touch event moved from the condition area to the task configuring area. When there are one or more fingerprints which generate a touch event moved from the condition area to the task configuring area, the controller 160 determines a fingerprint which generates the final touch event, as a sensed fingerprint. The controller 160 displays the configured task on the display unit 110. For example, the configured task displayed by the controller 160, on the display unit 110, may be a shortcut generated by combining the selected (or moved) condition (or the task list, or the item which a user can designate) and the sensed fingerprint.

When the sensed fingerprint is not registered beforehand, the controller 160 controls fingerprint registration for identifying the selected (or moved) condition (or the task list, or the item which a user can designate).

For example, the controller 160 identifies a task to be generated by the selected (or moved) condition (or the task list, or the item which a user can designate). The controller 160 displays, on the display unit 110, a shortcut generated by combining the selected (or moved) condition (or the task list, or the item which a user can designate) and the sensed fingerprint. Otherwise, the controller 160 identifies a task generated by combining the selected condition (or the task list, or the item which a user can designate) and the sensed fingerprint. The controller 160 displays, on the display unit 110, a guide screen for the fingerprint registration. The guide screen for the fingerprint registration may be a user interface which is required for the fingerprint registration for condition identification by a user. For example, a user can perform at least one fingerprint registration operation such as a drag, a swipe and/or a touch on the fingerprint recognition unit 150 along the guide screen for the fingerprint registration. The controller 160 registers a fingerprint of the user by sensing the fingerprint registration operation of the user. The controller 160 stores the registered fingerprint in the storage unit 140.

The controller 160 configures a task by combining the selected (or moved) condition (or the task list, or the item which a user can designate) and the registered fingerprint. For example, the operation of configuring the task by combining the selected (or moved) condition and the registered fingerprint may include configuring a shortcut and configuring a task such that the selected task execution subject can execute the selected task execution object when the registered fingerprint is input to the fingerprint recognition unit 150. The controller 160 displays the configured task on the display unit 110. For example, the controller 160 may display, on the display unit 110, a shortcut generated by combining the selected (or moved) condition (or the task list, or the item which a user can designate) and the registered fingerprint.

Figure 2:
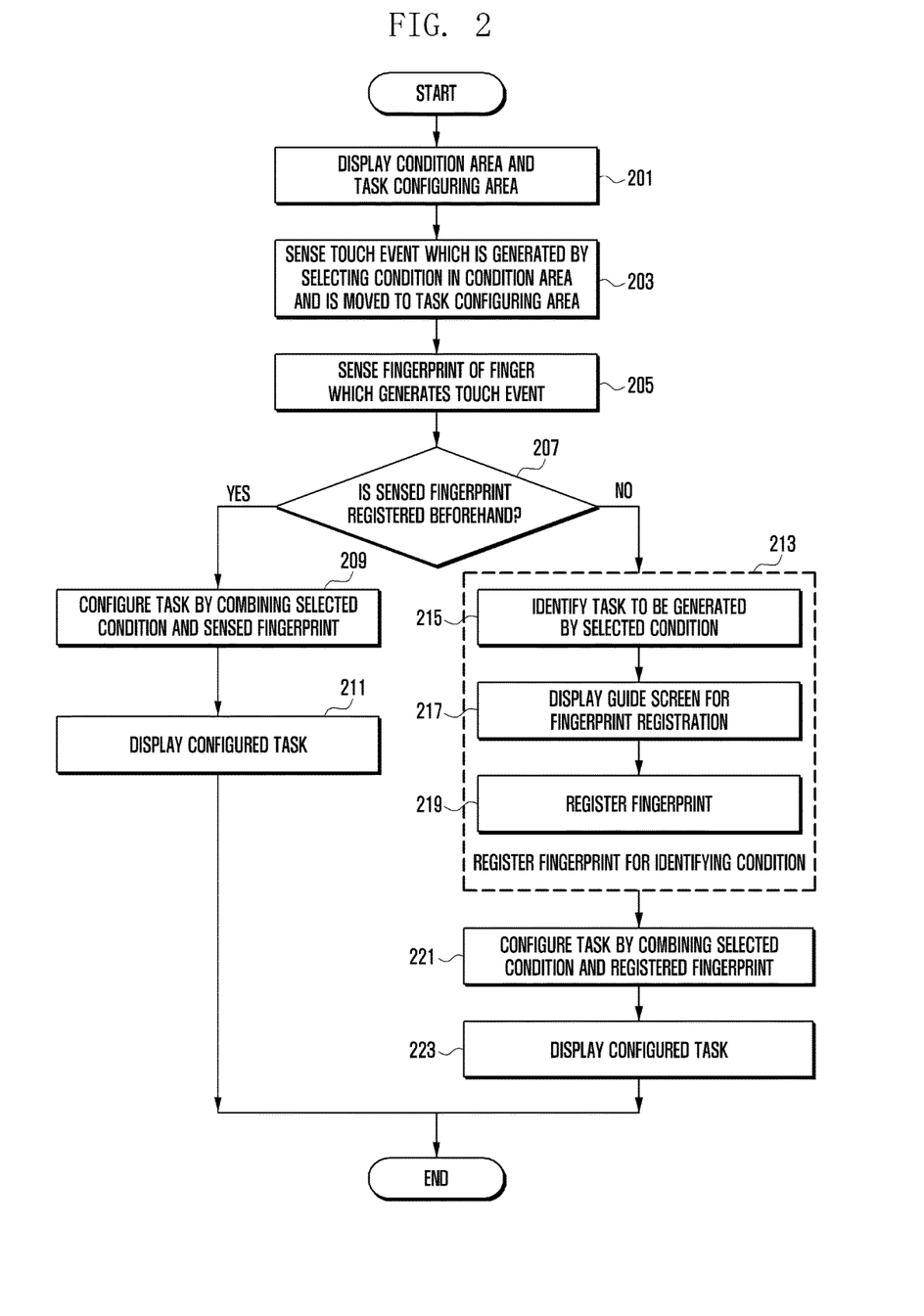
FIG. 2 is a flowchart illustrating a task configuring method, according to an embodiment of the present invention.

FIG. 2 is a flowchart illustrating a task configuring method of the electronic device, according to an embodiment of the present invention.

The electronic device 100, at step 201, displays a first area and a second area. For example, the first area may include a condition area that includes a condition which a user is to perform (or, a task list, and an item which the user can designate). For example, the condition area may include an area on which at least one task execution subject is displayed and an area on which a task execution object is displayed. For example, the first area includes a condition which a user is to perform (e.g., a task list, and an item which the user can designate). The item which a user can designate may be the condition which a user is to perform.

The second area (e.g., the task configuring area), on which an operation to be performed by a combination of items is displayed, corresponds to an area, on which a user displays the selected condition and a fingerprint of the user is recognized. The second area can display a task to be generated by the selected condition when a user generates a touch event by which a condition (or a task list) is moved from the condition area to a task configuring area. The item which a user can designate may be the condition which a user is to perform. The second area may be a task configuring area on which a task to be generated by a condition which a user is to perform is displayed. The area on which the task execution subject is displayed can display, for example, an application list including applications which perform at least one task, a communication channel list (e.g., a phone call, a message, an E-mail and a Social Network Service (SNS)) and a function list of an electronic device (e.g., taking a picture, finding, listening to music, and navigation).

The area on which the task execution object is displayed displays a target to perform a task. The area on which the task execution object is displayed may include, for example, a person's name, a location, a file name, etc.

The second area corresponds to an area, on which a user displays the selected condition and a fingerprint of the user is recognized and can display a task to be generated by the selected condition when a user generates a touch event by which a condition (or a task list, or the item which a user can designate) is moved from the first area to the second area. For example, the operation of generating the touch event by which the condition (or the task list, or the item which a user can designate) is moved from the first area to the second area, by a user, may be an operation of dragging and/or swiping the condition (or the task list, or the item which a user can designate) to the second area.

For example, the second area recognizes the fingerprint of a user by sensing the operation of dragging and/or swiping the condition (or the task list, or the item which a user can designate) to the second area.

For example, the electronic device 100 senses a fingerprint of a user while at least one condition (or the task list, or the item which a user can designate) is being moved from the first area to the second area, can sense a fingerprint of a user while at least one condition (or the task list, or the item which a user can designate) has been completely moved from the first area to the second area, or can sense a fingerprint of a user when at least one condition (or the task list, or the item which a user can designate) is touched in the first area. The electronic device 100, when a plurality of fingerprints of fingers generate a touch event, senses a fingerprint of a finger, which generates the final touch event.

The electronic device 100, at step 203, can sense a touch event in which the condition (or the task list, or the item which a user can designate) is selected on the first area (e.g., the condition area) and is moved to the second area (e.g., the task configuring area).

When a user generates a touch event by which the task execution subject and the task execution object are selected in the first area, the electronic device 100 senses the touch event. For example, the touch event may be the operation of dragging and/or swiping the condition (or the task list, or the item which a user can designate) to the second area.

The electronic device 100, at step 205, senses a fingerprint of a finger which generates the touch event.

When a user generates a touch event by which the task execution subject and the task execution object are selected in the first area, the electronic device 100 senses a fingerprint of a finger which generates the touch event. For example, the fingerprint recognition unit 150 senses which finger from among the five fingers of the left or right hand is the finger having a fingerprint which has generated the touch event by which the condition or the task list is dragged and/or swiped to the task configuring area.

The electronic device 100, at step 207, determines whether the sensed fingerprint of the finger which has generated the touch event is a fingerprint which has been registered beforehand.

The electronic device 100 registers a fingerprint of a user beforehand using the fingerprint recognition unit 150. The electronic device 100, at step 207, determines whether the sensed fingerprint is registered beforehand by comparing the pre-registered fingerprint with the sensed fingerprint.

When the sensed fingerprint is registered beforehand, the electronic device 100, at step 209, configures a task by combining the selected or moved condition (or the task list, or the item which a user can designate) and the sensed fingerprint. For example, the operation of configuring the task by combining the selected or moved condition and the sensed fingerprint includes configuring a shortcut and configuring a task such that the selected task execution subject can execute the selected task execution object when the sensed fingerprint is input to the electronic device 100.

For example, as there are one or more fingerprints which generate a touch event moved from the first area to the second area, the electronic device 100 determines a fingerprint which generates the final touch event as a sensed fingerprint.

The electronic device 100, at step 211, displays the configured task. For example, the configured task displayed by the electronic device 100 may correspond to displaying a shortcut generated by combining the selected or moved condition and the sensed fingerprint.

When the sensed fingerprint is not registered beforehand, the electronic device 100, at step 213, registers a fingerprint for identifying the selected or moved condition. This step may include a step of identifying a task to be generated by a selected condition, a step of displaying a guide screen for fingerprint registration, and a step of registering a fingerprint.

For example, the electronic device 100, at step 215, identifies a task to be generated by the selected or moved condition, task list, or the item which a user can designate. The identifying of the task to be generated by the selected (or moved) condition corresponds to identifying a shortcut by displaying the shortcut generated by combining the selected condition and the sensed fingerprint. Otherwise, the identifying of the task to be generated by the selected condition corresponds to identifying a task generated by combining the selected condition and the sensed fingerprint. The electronic device 100, at step 217, displays the guide screen for the fingerprint registration. The guide screen for the fingerprint registration may be a user interface which is required for the fingerprint registration for condition identification by a user. For example, a user, at step 217, can perform at least one fingerprint registration operation such as a drag, a swipe and/or a touch on the fingerprint recognition unit 150 along the guide screen for the fingerprint registration. The electronic device 100, at step 219, registers a fingerprint of a user by sensing the fingerprint registration operation along the guide screen for the fingerprint registration by the user.

The electronic device 100, at step 221, configures a task by combining the selected or moved condition, task list, or the item which a user can designate and the registered fingerprint.

For example, the operation of configuring the task by combining the selected condition and the registered fingerprint may include configuring a shortcut and configuring a task such that the selected task execution subject can execute the selected task execution object when the registered fingerprint is input to the electronic device 100.

The electronic device 100, at step 223, displays the configured task. For example, the configured task displayed by the electronic device 100 may include displaying a shortcut generated by combining the selected condition and the registered fingerprint.

Figure 3:
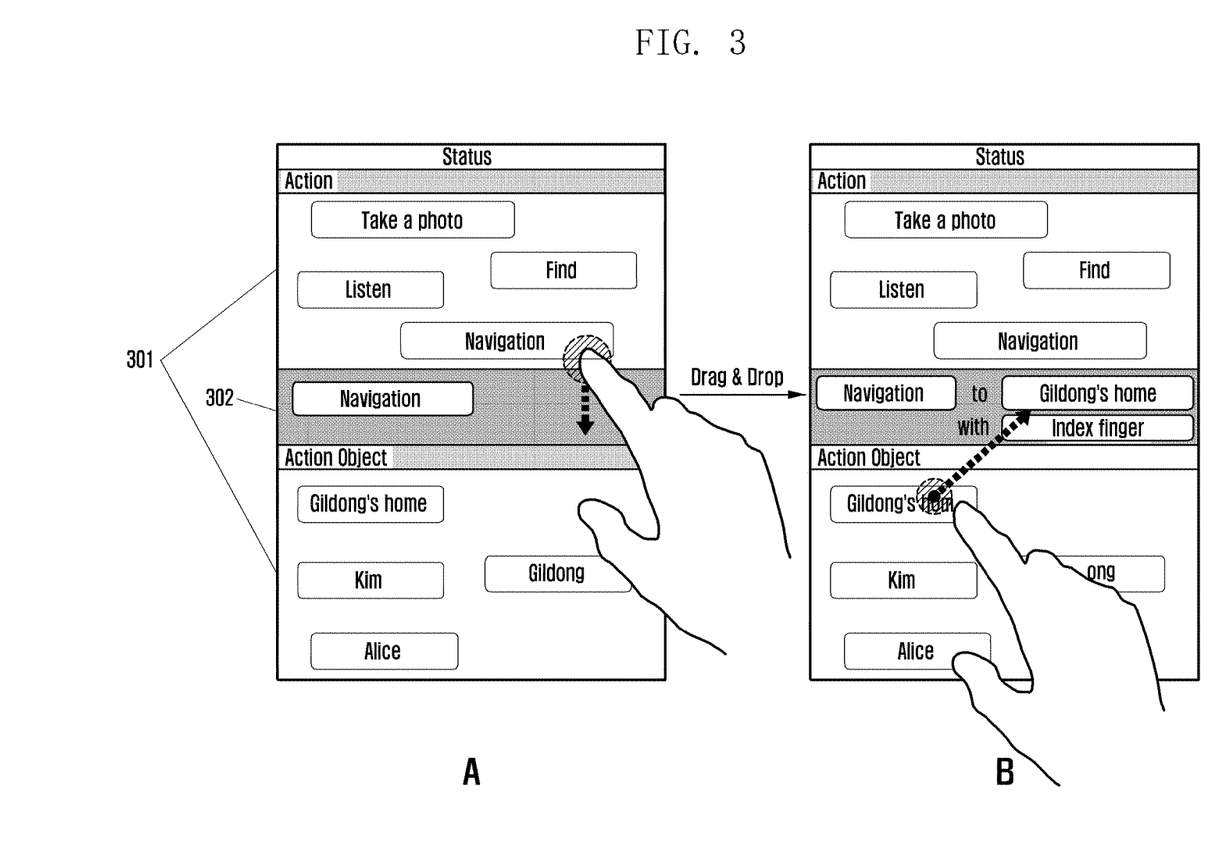
FIG. 3 is a diagram illustrating a task configuring method of an electronic device using a fingerprint, which is registered beforehand, according to an embodiment of the present invention.

FIG. 3 is a diagram illustrating a task configuring method of an electronic device 100 using a fingerprint which is registered beforehand, according to an embodiment of the present invention.

A condition area, a task configuring area and a condition are disclosed in FIGS. 3 to 6. The condition area is the same as the first area, the task configuring area is the same as the second area, and the condition is the same as the task list or the item which a user can designate.

On screen A, the electronic device 100 displays a condition area 301 and a task configuring area 302. The condition area 301 may include an area on which a task execution subject is displayed, i.e., the area disposed at an upper end with respect to the task configuring area 302, and an area on which a task execution object is displayed, i.e., the area disposed at a lower end with respect to the task configuring area 302.

The area on which the task execution subject is displayed can display, for example, an application list including applications which perform at least one task, and a function list of an electronic device (e.g., taking a picture, finding, listening to music, and navigation). The area on which the task execution object is displayed displays a target to perform a task. The area on which the task execution object is displayed may include, for example, a person's name, a location, a file name, etc.

On screen B, a user can display the selected condition on the task configuring area 302. The task configuring area 302 corresponds to an area on which a user displays the selected condition and a fingerprint of the user is recognized and can display a task to be generated by the selected condition when a user generates a touch event by which a condition or a task list is moved from the condition area to the task configuring area. The task configuring area 302 displays a shortcut generated by combining the selected condition and the sensed fingerprint.

For example, when a user selects "navigation" in the condition area including the at least one task execution subject, on which a function list of the electronic device, including "take a photo", "find", "listen" and "navigation", is displayed, the electronic device 100 displays the task execution subject on the task configuring area 302.

When the user selects "Gildong's House" in the condition area including the at least one task configuring object, on which a location or person's names such as "Gildong's House", "Kim", "Alice" and "Gildong" is displayed, the electronic device 100 displays "Gildong's House" as the task execution object on the task configuring area 302.

At this time, when the sensed fingerprint is registered beforehand, the electronic device 100 configures a task by combining the selected condition and the sensed fingerprint. The task configuring area 302 can display the selected task execution subject, the selected task execution object, and a fingerprint of a finger which is to identify the condition.

For example, when the fingerprint recognition unit 150 senses one or more fingerprints which generate a touch event moved from the condition area to the task configuring area, a fingerprint which generates the final touch event moved from the condition area to the task configuring area can be displayed on the task configuring area 302 as the sensed fingerprint. On screen A and screen B, since a user generates a touch event which moves a task list of the condition area to the task configuring area using an index finger, a fingerprint of a finger for condition identification is displayed as the index finger.

When a user performs a shortcut function, if the user performs fingerprint recognition using an index finger, the electronic device 100 performs a navigation operation to "Gildong's House".

Figure 4:
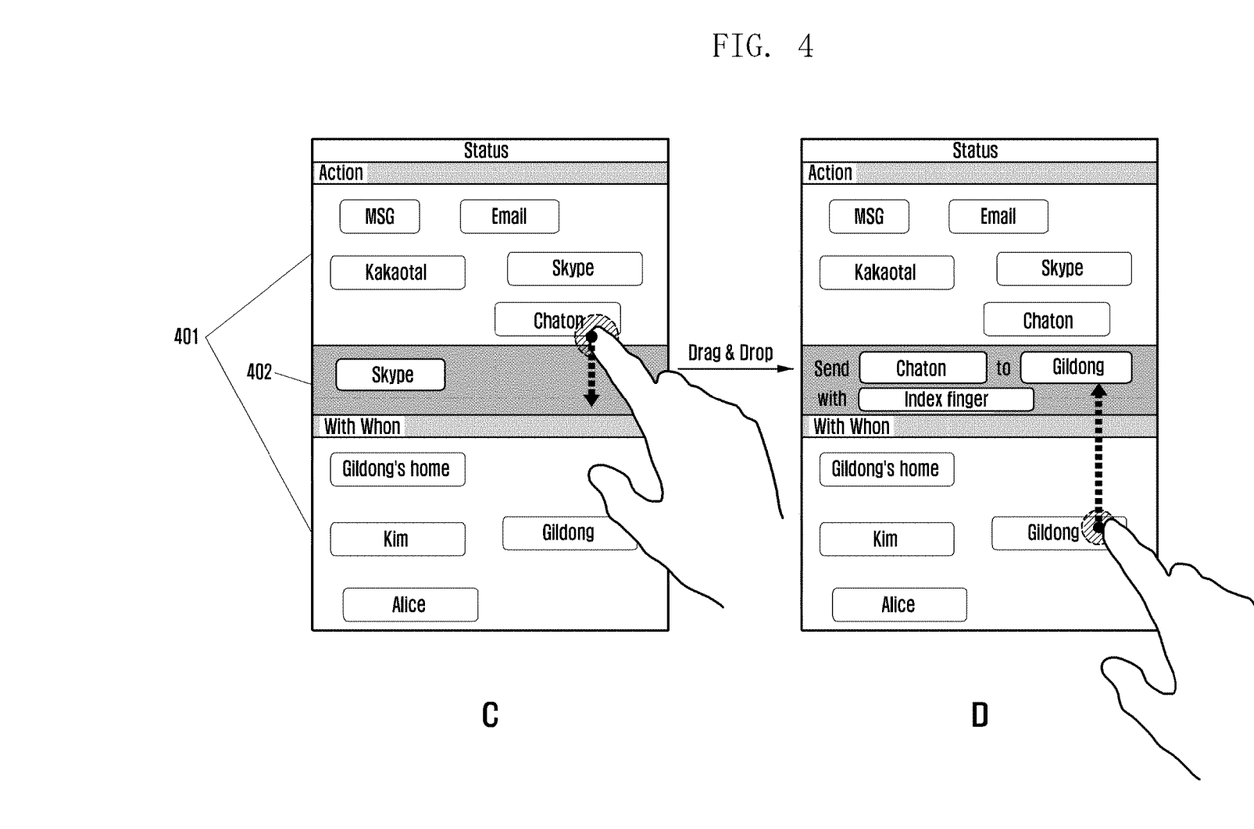
FIG. 4 is a diagram illustrating a communication channel task configuring method of an electronic device using a fingerprint, which is registered beforehand according to an embodiment of the present invention.

FIG. 4 is a diagram illustrating a communication channel task configuring method of an electronic device 100 using a fingerprint, which is registered beforehand, according to an embodiment of the present invention.

On screen C, the electronic device 100 displays a condition area 401 and a task configuring area 402. The condition area 401 may include an area on which a task execution subject is displayed, i.e., the area disposed at an upper end with respect to the task configuring area 402, and an area on which a task execution object is displayed, i.e., the area disposed at a lower end with respect to the task configuring area 402.

An area on which the task execution subject is displayed may display, for example, a communication channel list (e.g., a phone call, a message, an E-mail and an SNS). The area, on which the task execution object is displayed, displays a target to perform a task. An area, on which the task execution object is displayed, may include, for example, a person's name.

On screen D, a user can display the selected condition on the task configuring area 402. The task configuring area 402 corresponds to an area on which a user displays the selected condition and a fingerprint of the user is recognized and can display a task to be generated by the selected condition when a user generates a touch event by which a condition or a task list is moved from the condition area to the task configuring area. The task configuring area 302 displays a shortcut generated by combining the selected condition and the sensed fingerprint.

For example, when a user selects "Chaton" in the condition area including the at least one task execution subject, on which a communication channel list including "Message, MSG", "Email", "Chaton (e.g., SNS)" is displayed, the electronic device 100 displays the task execution subject (e.g., a subject of the communication channel) on the task configuring area 402.

When the user selects "Gildong" in the condition area including the at least one task configuring object, on which a location or person's names such as "Kim", "Alice" and "Gildong" is displayed, the electronic device 100 displays "Gildong" as the task execution object on the task configuring area 402.

At this time, when the sensed fingerprint is registered beforehand, the electronic device 100 configures a task by combining the selected condition and the sensed fingerprint. The task configuring area 402 displays the selected task execution subject, the selected task execution object, and a fingerprint of a finger which is to identify the condition.

For example, when the fingerprint recognition unit 150 senses one or more fingerprints which generate a touch event moved from the condition area to the task configuring area, a fingerprint which generates the final touch event moved from the condition area to the task configuring area can be displayed on the task configuring area 402 as the sensed fingerprint. In screen C and screen D, since a user generates a touch event which moves a task list of the condition area to the task configuring area using an index finger, a fingerprint of a finger for condition identification is displayed as the index finger.

When a user performs a shortcut function, if the user performs fingerprint recognition using an index finger, the electronic device 100 performs a "Chaton" operation to "Gildong".

Figure 5A:
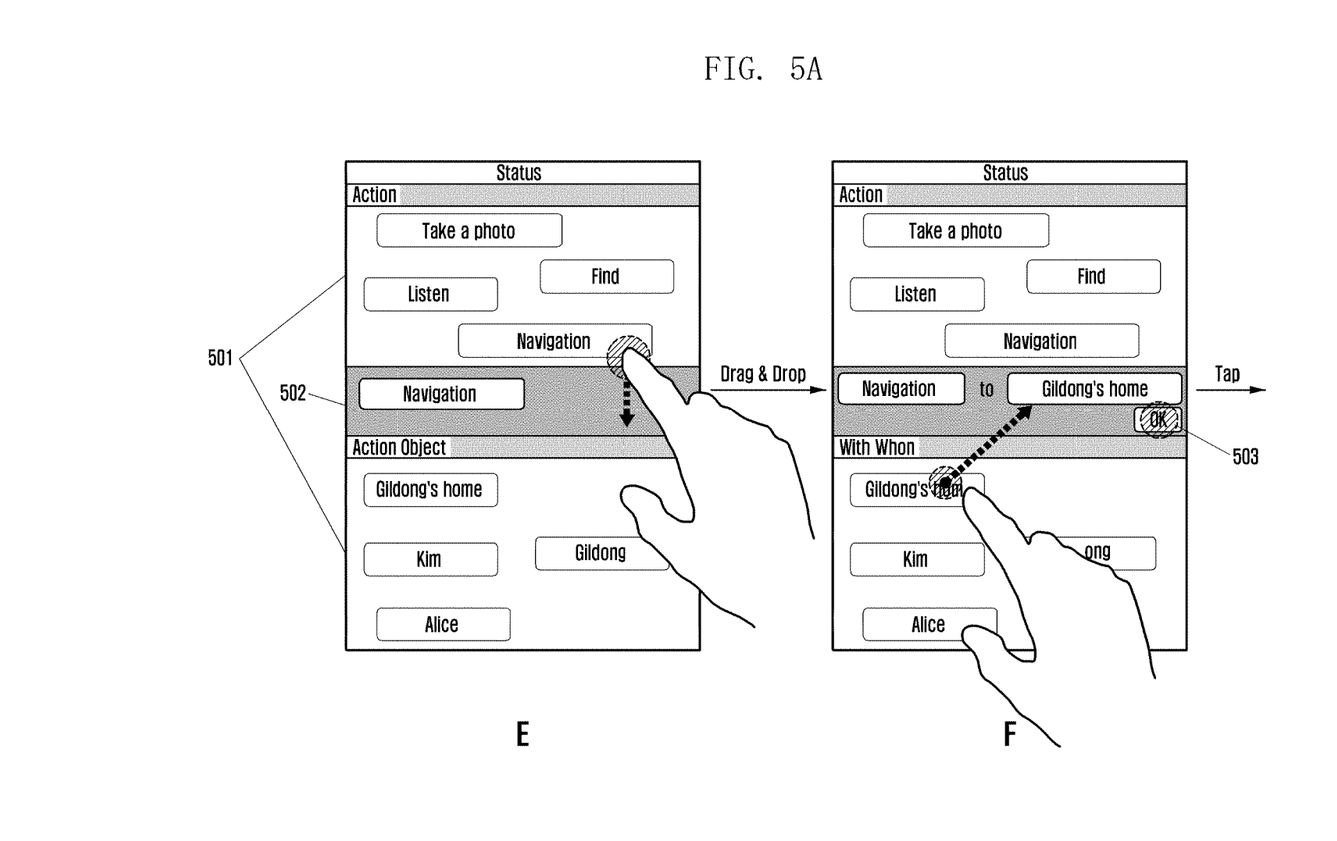
FIGS. 5A and 5B are diagrams illustrating a task configuring method of an electronic device when a fingerprint has not been registered beforehand according to an embodiment of the present invention.
Figure 5B:
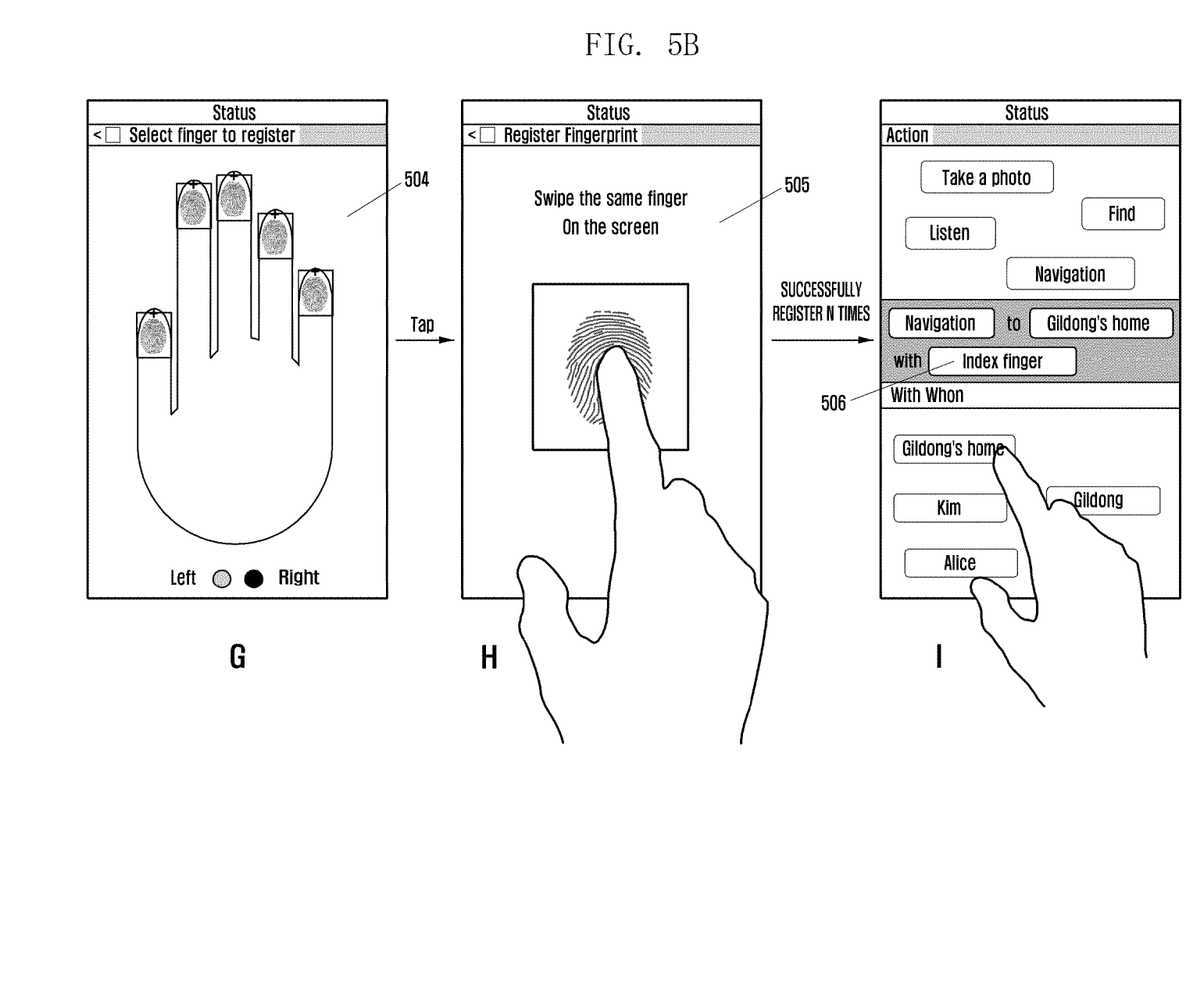

FIGS. 5A and 5B are diagrams illustrating a task configuring method of an electronic device when a fingerprint has not been registered beforehand, according to an embodiment of the present invention.

On screen E, the electronic device 100 displays a condition area 501 and a task configuring area 502. The condition area 501 may include an area on which a task execution subject is displayed, i.e., the area disposed at an upper end with respect to the task configuring area 502, and an area on which a task execution object is displayed, i.e., the area disposed at a lower end with respect to the task configuring area 502.

The area on which the task execution subject is displayed can display, for example, an application list including applications which perform at least one task, and a function list of an electronic device (e.g., taking a picture, finding, listening to music, and navigation). The area, on which the task execution object is displayed, displays a target to perform a task. The area on which the task execution object is displayed may include, for example, a person's name, a location, a file name, etc.

On screen F, a user can display the selected condition on the task configuring area 502. The task configuring area 502 corresponds to an area on which a user displays the selected condition and a fingerprint of the user is recognized and can display a task to be generated by the selected condition when a user generates a touch event by which a condition or a task list is moved from the condition area to the task configuring area. The task configuring area 502 displays a shortcut generated by combining the selected condition and the sensed fingerprint.

For example, when a user selects "navigation" in the condition area including the at least one task execution subject, on which a function list of the electronic device, including "take a photo", "find", "listen" and "navigation", is displayed, the electronic device 100 displays the task execution subject on the task configuring area 502.

When the user selects "Gildong's House" in the condition area including the at least one task configuring object, on which a location or person's names such as "Gildong's House", "Kim", "Alice" and "Gildong" is displayed, the electronic device can display the task execution object on the task configuring area 502.

At this time, when the sensed fingerprint is not registered beforehand, the electronic device 100 identifies a task by combining the selected condition and the sensed fingerprint as indicated by reference numeral 503. The task configuring area 502 can display the selected task execution subject and the selected task execution object. When a user identifies the selected task execution subject and the selected task execution object as indicated by reference numeral 503, the electronic device 100 displays a guide screen for fingerprint registration, on screen G. The guide screen for the fingerprint registration may be a user interface 504 which is required for the fingerprint registration for condition identification by a user. The user can select a finger to be registered on the user interface 504.

On screen H, a user can perform at least one fingerprint registration operation such as a drag, a swipe and/or a touch on the fingerprint recognition unit 150 along the guide screen for the fingerprint registration, as indicated by reference numeral 505. The electronic device 100 registers a fingerprint of a user by sensing the fingerprint registration operation along the guide screen for the fingerprint registration by the user.

On screen I, the electronic device configures a task by combining the selected condition and the registered fingerprint. Since a user registers a fingerprint using an index finger, a fingerprint of a finger for condition identification is displayed as an index finger.

When a user performs a shortcut function, if the user performs fingerprint recognition using an index finger, the electronic device 100 performs a navigation operation to "Gildong's House".

Figure 6:
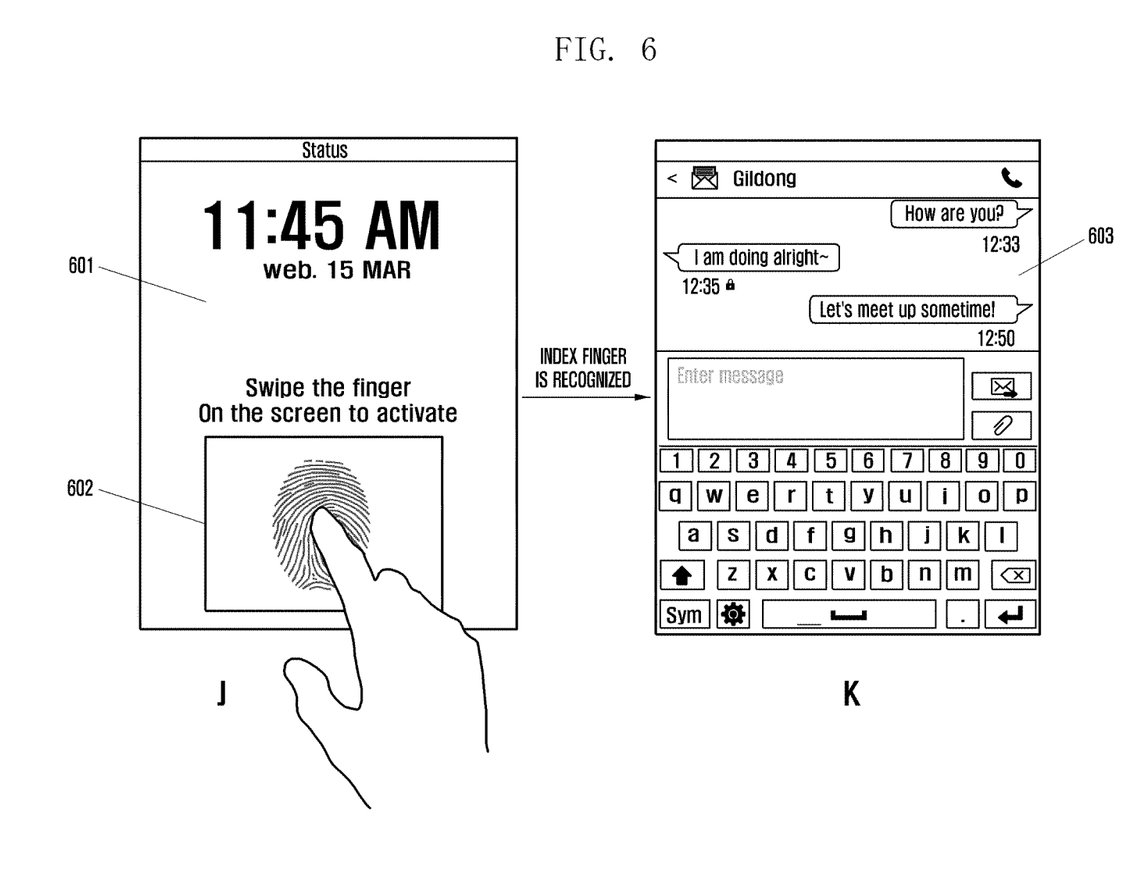
FIG. 6 is a diagram illustrating a method of executing a configured task of an electronic device, according to an embodiment of the present invention.

FIG. 6 is a diagram illustrating a method of executing a configured task of an electronic device 100, according to an embodiment of the present invention.

On screen J, the electronic device 100 displays a user interface 601 including an area 602 which can recognize a fingerprint of a user, and executes a shortcut function. A user can perform an operation for the fingerprint recognition on the area 602 which can recognize a fingerprint of a user.

On screen K, when a user performs an operation for fingerprint recognition, the electronic device 100 determines whether the recognized fingerprint is a fingerprint for condition identification to perform a previously-configured task. On screen J and screen K, when a user performs a fingerprint recognition operation using an index finger, the electronic device 100 configures a task such that a "Chaton" operation to "Gildong" is performed through a shortcut function.

While one or more embodiments of the present invention have been described with reference to the figures, it will be understood by those of ordinary skill in the art that various changes in form and details may be made therein without departing from the spirit and scope of the present invention, as defined by the following claims and their equivalents.

What is claimed is:

1. A task configuring method of an electronic device using fingerprint recognition, the task configuring method comprising:
displaying a first area and a second area, the first area comprising a first end area including at least one application which a user can select for executing a task and a second end area including at least one object which the user can select to execute the task, and the second area displaying the selected at least one application;
sensing a touch event used to move the at least one application and at least one subject from the first end area and the second end area, respectively, to the second area;
identifying a fingerprint of a finger which generates the touch event; and
configuring a task by combining the at least one moved application, the at least one moved subject, and the identified fingerprint.

2. The task configuring method of claim 1, wherein the at least one application includes at least one subject of the task execution.

3. The task configuring method of claim 2, further comprising:
determining whether the identified fingerprint is registered beforehand; and
when the identified fingerprint is registered beforehand, configuring the task by combining the at least one moved application, the at least one moved subject, and the identified fingerprint.

4. The task configuring method of claim 3, further comprising:
when the identified fingerprint is not registered beforehand, registering a fingerprint for identifying the at least one moved application and the at least one moved subject; and
configuring a task by combining the at least one moved application, the at least one moved subject, and the registered fingerprint.

5. The task configuring method of claim 4, wherein registering the fingerprint comprises:
identifying a task to be generated;
displaying a guide screen for fingerprint registration; and registering the fingerprint by sensing a touch event for fingerprint registration.

6. The task configuring method of claim 2, wherein identifying the fingerprint of the finger which generates the touch event comprises at least one of:
    sensing the fingerprint of the finger while the at least one application and the at least one subject are moved from the first area to the second area;
    sensing the fingerprint of the finger when the at least one application and the at least one subject have been completely moved from the first area to the second area; and
    sensing the fingerprint of the finger when the at least one application and the at least one subject are touched on the first area.

7. The task configuring method of claim 2, wherein, in identifying the fingerprint of the finger, when a plurality of fingerprints of fingers generate the touch event, a fingerprint of a finger which generates a final touch event is sensed.

8. The task configuring method of claim 2, further comprising displaying the configured task on the second area.

9. The task configuring method of claim 8, wherein displaying the configured task on the second area comprises displaying the task to be generated by combining the at least one application which is a subject of the task execution and the at least one object of the task execution, and displaying the identified fingerprint as an index for identifying the task to be generated.

10. An electronic device comprising:
    a display unit;
    a user input unit;
    a fingerprint recognition unit; and
    a controller configured to display, on the display unit, a first area and a second area, the first area comprising a first end area including at least one application which a user can select for executing a task and a second end area including at least one object which the user can select to execute the task, and the second area displaying the selected at least one application, to sense, through the user input unit, a touch event used to move the at least one application and at least one subject from the first end area and the second end area, respectively, to the second area, to identify, through the fingerprint recognition unit, a fingerprint of a finger which generates the touch event, and to configure a task by combining the at least one moved application, the at least one subject, and the identified fingerprint.

11. The electronic device of claim 10, wherein the at least one application includes at least one subject of the task execution.

12. The electronic device of claim 11, wherein the controller is further configured to determine whether the identified fingerprint is registered beforehand, and, when the sensed fingerprint is registered beforehand, to configure the task by combining the at least one moved application, the at least one moved subject, and the identified fingerprint.

13. The electronic device of claim 12, wherein the controller, when the identified fingerprint is not registered beforehand, is further configured to register a fingerprint through the fingerprint recognition unit in order to identify the at least one moved application and the at least one moved subject, and to configure a task by combing the at least one moved application, the at least one moved subject, and the registered fingerprint.

14. The electronic device of claim 13, wherein the controller is further configured to identify a task to be generated, to display, on the display unit, a guide screen for fingerprint registration, and to register the fingerprint by sensing a touch event for fingerprint registration from the fingerprint recognition unit.

15. The electronic device of claim 11, wherein the controller is further configured to sense, through the fingerprint recognition unit, the fingerprint of the finger while the at least one application and the at least one moved subject are moved from the first area to the second area, as a fingerprint of a finger which generates the touch event, to sense, through the fingerprint recognition unit, the fingerprint of the finger when the at least one application and the at least one moved subject have been completely moved from the first area to the second area, as a fingerprint of a finger which generates the touch event, and to sense, through the fingerprint recognition unit, the fingerprint of the finger when the at least one application and the at least one moved subject are touched on the first area, as a fingerprint of a finger which generates the touch event.

16. The electronic device of claim 11, wherein the controller, when a plurality of fingerprints of fingers generate the touch event, is further configured to sense a fingerprint of a finger which generates a final touch event.

17. The electronic device of claim 11, wherein the controller is further configured to display the configured task on the second area.

18. The electronic device of claim 17, wherein the controller is further configured to display the configured task on the second area by combining the at least one application which is a subject of the task execution and the at least one object of the task execution, and to display on the second area the identified fingerprint as an index for identifying the task to be generated.

* * * * *